US011939862B2

(12) United States Patent
Williams et al.

(10) Patent No.: US 11,939,862 B2
(45) Date of Patent: Mar. 26, 2024

(54) CEMENTING UNIT POWER ON SELF TEST

(71) Applicant: Halliburton Energy Services, Inc., Houston, TX (US)

(72) Inventors: Derek R. Williams, Duncan, OK (US); Charles E. Neal, III, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 145 days.

(21) Appl. No.: 17/486,400

(22) Filed: Sep. 27, 2021

(65) Prior Publication Data

US 2023/0094201 A1 Mar. 30, 2023

(51) Int. Cl.
| E21B 44/00 | (2006.01) |
| E21B 33/14 | (2006.01) |
| E21B 47/12 | (2012.01) |
| F04B 51/00 | (2006.01) |

(52) U.S. Cl.
CPC .............. *E21B 47/12* (2013.01); *E21B 33/14* (2013.01); *E21B 44/005* (2013.01)

(58) Field of Classification Search
None
See application file for complete search history.

(56) References Cited

U.S. PATENT DOCUMENTS

| 5,624,182 A | 4/1997 | Dearing, Sr. et al. |
| 7,720,574 B1 | 5/2010 | Roys |
| 10,253,625 B2 | 4/2019 | Williams et al. |
| 10,392,918 B2 | 8/2019 | Harkless et al. |
| 10,801,491 B2 | 10/2020 | Urdaneta et al. |
| 11,002,269 B2 | 5/2021 | Pal et al. |
| 2003/0072208 A1 | 4/2003 | Rondeau et al. |
| 2003/0168258 A1 | 9/2003 | Koederitz |
| 2006/0052903 A1 | 3/2006 | Bassett |
| 2012/0025997 A1 | 2/2012 | Liu et al. |

(Continued)

FOREIGN PATENT DOCUMENTS

| CA | 2999968 C | 4/2017 |
| CN | 110838155 A | 2/2020 |

(Continued)

OTHER PUBLICATIONS

JP-4766814-B2 English Language Translation (Year: 2011).*

(Continued)

*Primary Examiner* — Curtis A Kuntz
*Assistant Examiner* — Jerold B Murphy
(74) *Attorney, Agent, or Firm* — Conley Rose, P.C.; Rodney B. Carroll

(57) ABSTRACT

A wellbore pumping unit comprising a main pump, a power source, a controller, and a plurality of sensors is provided. A method of performing a diagnostic check of the unit controller and the plurality of sensors when power is applied to the unit controller. A diagnostic application executing in memory writes a status of the plurality of analog inputs of a plurality of valve position sensors, a status of a plurality of frequency inputs of a plurality of flowmeters, and a plurality of calibration data files that correlate to a plurality of sensors to a diagnostic report file. The status of the sensor inputs and calibration data files can be a pass or a fail. The status of the sensor inputs can be displayed on a human machine interface.

19 Claims, 7 Drawing Sheets

(56) References Cited

U.S. PATENT DOCUMENTS

| | | | |
|---|---|---|---|
| 2016/0186531 A1* | 6/2016 | Harkless | E21B 33/13 |
| | | | 702/6 |
| 2016/0194942 A1 | 7/2016 | Wiegman et al. | |
| 2017/0002644 A1 | 1/2017 | Chen et al. | |
| 2017/0022788 A1 | 1/2017 | Oehring et al. | |
| 2017/0226842 A1* | 8/2017 | Omont | G06Q 50/02 |
| 2018/0363459 A1* | 12/2018 | Williams | E21B 47/005 |
| 2019/0128254 A1 | 5/2019 | Shichi et al. | |
| 2019/0317488 A1 | 10/2019 | Al-Maghlouth et al. | |
| 2020/0103889 A1 | 4/2020 | Cella et al. | |
| 2020/0191130 A1 | 6/2020 | Van Der Spek et al. | |
| 2020/0347713 A1 | 11/2020 | Omont et al. | |
| 2020/0355067 A1 | 11/2020 | Williams et al. | |
| 2020/0362664 A1 | 11/2020 | Urdaneta et al. | |
| 2021/0306804 A1* | 9/2021 | Adler | H04W 4/029 |
| 2022/0003229 A1* | 1/2022 | Mu | F04B 17/06 |

FOREIGN PATENT DOCUMENTS

| | | | |
|---|---|---|---|
| CN | 210402440 U | 4/2020 | |
| CN | 212272574 U | 1/2021 | |
| EP | 1485574 B1 | 11/2007 | |
| JP | 4766814 B2 * | 9/2011 | F16K 37/0091 |
| KR | 101154275 B1 | 6/2012 | |
| KR | 20170030823 A | 3/2017 | |
| KR | 20180044086 A | 5/2018 | |
| KR | 20200075229 A | 6/2020 | |
| WO | 2016160459 A2 | 10/2016 | |
| WO | 2021050943 A1 | 3/2021 | |

OTHER PUBLICATIONS

Foreign Communication from Related Application—International Search Report and Written Opinion of the International Searching Authority, International Application No. PCT/US2021/058718, dated Jul. 26, 2022, 12 pages.

Filing Receipt, Specification and Drawings for U.S. Appl. No. 17/529,061, entitled "Predictive Pump Maintenance Based Upon Utilization and Operating Conditions," filed Dec. 2, 2021, 78 pages.

Electronic Acknowledgement Receipt, Specification and Drawings for International Application No. PCT/US2021/60309, entitled "Predictive Pump Maintenance Based Upon Utilization and Operating Conditions," filed Nov. 22, 2021, 57 pages.

Electronic Acknowledgement Receipt, Specification and Drawings for U.S. Appl. No. 17/518,867, entitled "Automated Mix Water Test," filed Nov. 18, 2021, 68 pages.

Electronic Acknowledgement Receipt, Specification and Drawings for International Patent Application No. PCT/US2021/58718, entitled "Automated Mix Water Test," filed Nov. 10, 2021, 68 pages.

Filing Receipt, Specification and Drawings for U.S. Appl. No. 17/518,869, entitled "Automated Configuration of Pumping Equipment," filed Nov. 18, 2021, 84 pages.

Electronic Acknowledgement Receipt, Specification and Drawings for International Patent Application No. PCT/US2021/58720, entitled "Automated Configuration of Pumping Equipment," filed Nov. 10, 2021, 84 pages.

Foreign Communication from Related Application—International Search Report and Written Opinion of the International Searching Authority, International Application No. PCT/US2021/058720, dated Aug. 1, 2022, 12 pages.

Foreign Communication from Related Application—International Search Report and Written Opinion of the International Searching Authority, International Application No. PCT/US2021/060309, dated Aug. 9, 2022, 12 pages.

English Translation of KR 101154275, 2012, 7 Pages.

English Translation of KR 20170030823, 2017, 9 Pages.

Office Action dated Jun. 7, 2023 (51 pages), U.S. Appl. No. 17/518,867, filed Nov. 4, 2021.

Office Action dated Oct. 2, 2023 (39 pages), U.S. Appl. No. 17/529,061, filed Nov. 17, 2021.

* cited by examiner

CEMENTING UNIT POWER ON SELF TEST

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In oil and gas wells a primary purpose of a barrier composition such as cement or a sealant is to isolate the formation fluids between zones, also referred to as zonal isolation and zonal isolation barriers. Cement is also used to support the metal casing lining the well, and the cement provides a barrier to prevent the fluids from damaging the casing and to prevent fluid migration along the casing.

Typically, an oil well is drilled to a desired depth with a drill bit and mud fluid system. A metal pipe (e.g., casing, liner, etc.) is lowered into the drilled well to prevent collapse of the drilled formation. Cement is placed between the casing and formation with a primary cementing operation. One or more downhole tools may be connected to the casing to assist with placement of the cement.

In a primary cementing operation, a cement blend tailored for the environmental conditions of the wellbore is pumped into the wellbore. This pumping operation may utilize pumping equipment which may include a plurality of components controlled by a controller such as valves and pumps. The plurality of components may require routine maintenance and, in some cases, repair of one or more components. Personnel may perform a diagnostic test of one or more of these components before a job. The diagnostic tests can generate data about the status of each component that is time consuming to log and report. Improved methods of determining the operational condition of the plurality of components is needed.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
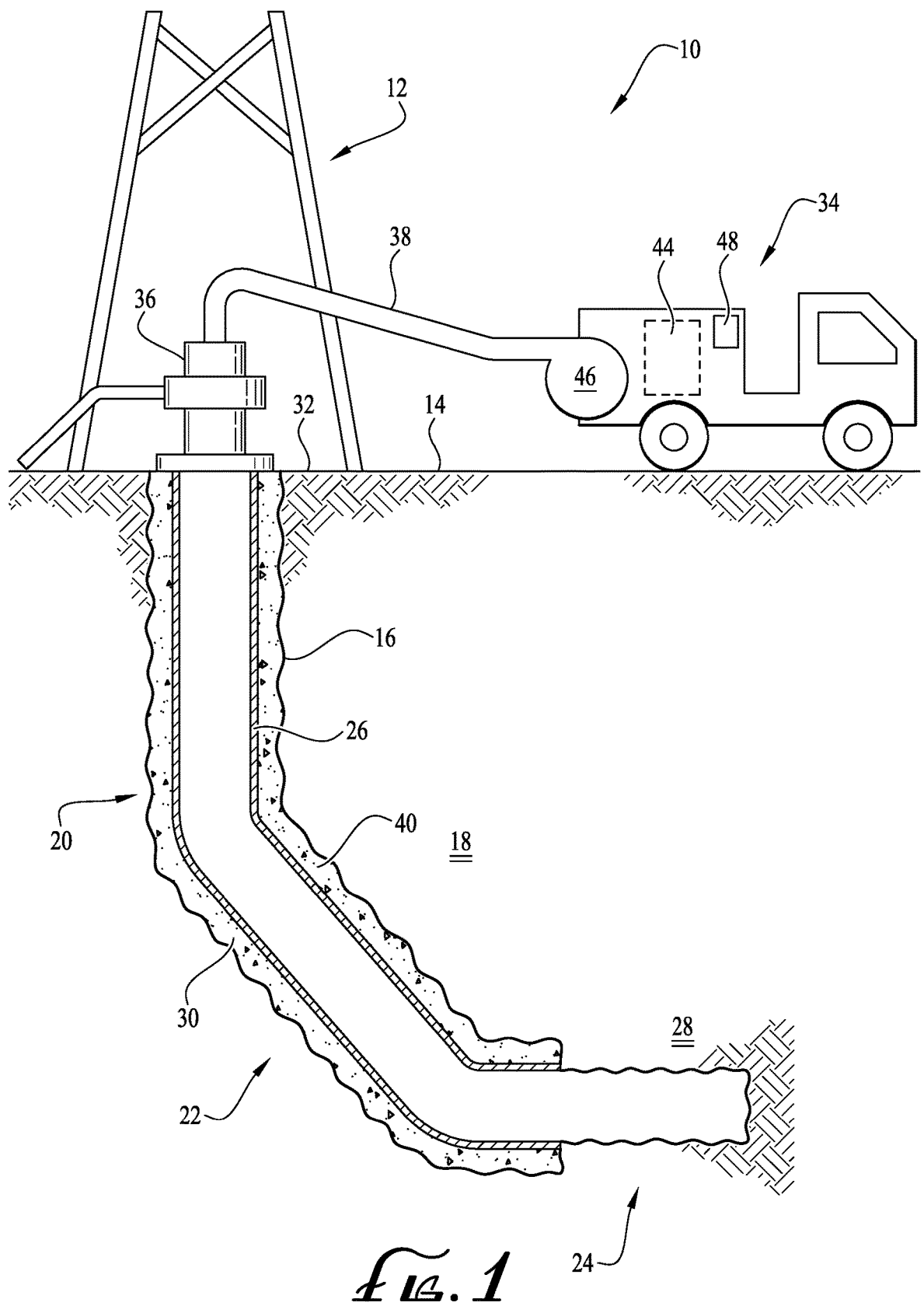
FIG. 1 is an illustration of an operating environment at a wellsite according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Oil well construction can follow a series of construction stages including drilling, cementing, and completion. Each stage can be carried out using specialized equipment and materials, to carry out a series of steps to complete each stage.

Examples of the various equipment that may be used at various stages include various configurations, types, and/or sizes of pumping equipment. For example, during the drilling stage, an oil well can be drilled with a drill bit, a mud system, and a mud pump. As the drill bit penetrates the earth strata, a drilling mud is pumped down a drill string to bring cuttings back to surface, an example of which includes a reciprocating (e.g., plunger-type) pump.

Also, for example, during the cementing stage, a cement pump may be used to introduce a cementitious slurry, e.g., a cement composition, into the annulus formed between the casing and the wellbore. The cement typically used for cementing oil wells can be a Portland cement comprised of a hydraulic cement with a source of free lime and alkali ions, a source of calcium carbonate, a source of calcium sulfate and an organic component. The mixing system can blend the dry cement with water to produce the cement slurry. The mixing system can include data acquisition system with pressure and density sensors. A unit controller can be communicatively connected to the mixing system, e.g., drums and valves, and the data acquisition system.

In another example, during the completion stage, a blender and high pressure pump may be used to fracture a formation with proppant slurry. The blender, also referred to as a blender unit, may include a mixing system for blending proppant, e.g., sand, and water with various additives, e.g., friction reducers to produce the proppant slurry. The high pressure pumps, also referred to as fracturing units, may deliver the proppant slurry into the wellbore with sufficient pressure to fracture the formation and deposit the proppant into the fractures.

The various pumping equipment used at varying well construction stages may include or be communicatively coupled to a unit controller. The unit controller may comprise a computer system with one or more processors, memory, input devices, and output devices. The unit controller may be programmable with one or more pumping procedures for the mixing and placement of wellbore treatment fluids. The unit controller can be communicatively connected to various components of the pumping equipment including the mixing system and main pump. For example, the unit controller may be communicatively coupled to a mixing drum, a water pump, a plurality of valves, an additive system, a main pump, and a data acquisition system.

The unit controller can establish control over the various components of the pumping equipment, e.g., the mixing system, with the data acquisition system providing feedback of the pumping operation. In some cases, the unit controller of two or more pumping equipment assemblies may be communicatively connected so that the pumping equipment assemblies cooperatively work together. For example, the blender and one or more high pressure pumps may cooperatively deliver proppant slurry to the wellbore.

The delivery of the wellbore treatment fluid, e.g., cement slurry, from the pumping equipment at a desired flowrate can depend on the components of the mixing and pumping equipment communicating with the unit controller. The unit controller must establish a communication connection with each input, e.g., sensor, and each output to the mixing and pumping equipment, e.g., a plurality of valves. The communicative coupling to each component may decline over time due to age, environmental conditions, and general degradation of operating ability during normal operation from sequential jobs. The service personnel can perform diagnostic tests on the various components, however, these diagnostic tests can be inconclusive. The logging of diagnostic test results can be time consuming and may result in an error of omission. A method of determining the status of the communication with the unit controller is needed.

One solution to the problem of performing a diagnostic test on a plurality of equipment inputs and outputs can include an application that runs when the unit controller is turned on. In an embodiment, the unit controller may perform a pre-job diagnostic test during a start-up procedure initiated by powering up the unit controller. When the service personnel starts up the pump unit, e.g., cementing pump equipment, the unit controller can be powered on. The terms start-up, power-up, turned-on, and power-on can refer to the action of supplying power to activate an assembly or to change the status from "off" to "on". When the unit controller is powered up, e.g., activated, a diagnostic application can be executed in non-transitory memory by a processor. The diagnostic application can check the status of the inputs and output to the unit controller. The results of the status check of the diagnostic application can be logged into data storage location on the unit controller and displayed on Human Machine Interface (HMI), e.g., the control display. The logged results of the diagnostic application may be downloaded by the service personnel from the unit controller. The method of performing an automated pre-job diagnostic of the communication with the unit controller can save time, increase efficiency, and improve the data reporting.

Another solution to the problem of reporting a pre-job diagnostic checklist can include an application that wirelessly communicates the results to a remote service center. In an embodiment, the unit controller may comprise a wireless communication assembly that establishes a wireless communication session to the remote service center. A mobile communication application can be executed in non-transitory memory by the processor in the unit controller. The mobile communication application can establish a wireless communication through a mobile network with the remote service center. The results of the status check of the diagnostic application can be transmitted to a data storage location or to a computer system at the remote service center. The diagnostic application executing on the unit controller may automatically execute the mobile communication application to report the results of the diagnostic check when the unit controller is powered up. The mobile communication application can increase the reliability of the pumping unit by reporting the results of the diagnostic application to the service center in real-time.

Disclosed herein is a method of performing an automated diagnostic test of the inputs and outputs of a unit controller. The results of the diagnostic test can be stored in a data storage location on the unit controller. The diagnostic test results can be wirelessly communicated to a remote service center. The results of the diagnostic test can increase the reliability of the pumping unit.

FIG. 1 illustrates a well site environment 10, according to one or more aspects of the present invention. The well site environment 10 comprises a servicing rig 12 that extends over and around a wellbore 16 that penetrates a subterranean formation 18 for the purpose of recovering hydrocarbons. The wellbore 16 can be drilled into the subterranean formation 18 using any suitable drilling technique. While shown as extending vertically from the surface 14 in FIG. 1, the wellbore 16 can also be deviated, horizontal, and/or curved over at least some portions of the wellbore 16. For example, the wellbore 16, or a lateral wellbore drilled off of the wellbore 16, can have a vertical portion 20, a deviated portion 22, and a horizontal portion 24. The wellbore 16 can be cased, open hole, or combination thereof. For example, a first portion extending from the surface can contain a string of casing 26 and a second portion can be a wellbore drilled into a subterranean formation 28. A primary casing string 26 can be placed in the wellbore 16 and secured at least in part by cement 30.

The servicing rig 12 can be one of a drilling rig, a completion rig, a workover rig, or other structure and supports cementing operations in the wellbore 16. The servicing rig 12 can also comprise a derrick, or other lifting means, with a rig floor 32 through which the wellbore 16 extends downward from the servicing rig 12. In some cases, such as in an off-shore location, the servicing rig 12 can be supported by piers extending downwards to a seabed. Alternatively, the servicing rig 12 can be supported by columns sitting on hulls and/or pontoons that are ballasted below the water surface, which can be referred to as a semi-submersible platform or floating rig. In an off-shore location, a casing can extend from the servicing rig 12 to exclude sea water and contain drilling fluid returns.

In an embodiment, the wellbore 16 can be completed with a cementing process that follows a cementing pumping procedure to place cement between the casing string 26 and the wellbore 16. Cement pumping equipment 34, also called pump unit, can be fluidly connected to a wellhead 36 by a supply line 38. The wellhead 36 can be any type of pressure containment equipment connected to the top of the casing string 26, such as a surface tree, production tree, subsea tree, lubricator connector, blowout preventer, or combination thereof. The wellhead 36 can anchor the casing string 26 at surface 14. The wellhead 36 can include one or more valves to direct the fluid flow from the wellbore and one or more sensors that gather pressure, temperature, and/or flowrate data. The service personnel can follow a cement pumping procedure with multiple sequential steps to place cement 30 into an annular space 40 between the casing string 26 and the wellbore 16. The service personnel can blend a volume of cement slurry tailored for the wellbore. The pumping 34 34 can pump a predetermined volume of cement slurry though the supply line 38, through the wellhead 36, and down the casing string 26.

The cement 30 can be Portland cement or a blend of Portland cement with various additives to tailor the cement for the wellbore environment. For example, retarders or accelerators can be added to the cement slurry to slow down or speed up the curing process. In some embodiments, the cement 30 can be a polymer designed for high temperatures. In some embodiments, the cement 30 can have additives such as fly ash to change the density, e.g., decrease the density, of the cement slurry.

The pump unit 34 may include mixing equipment 44, pumping equipment 46, and a unit controller 48. The mixing equipment 44 can be in the form of a jet mixer, recirculating mixer, a batch mixer, a single tub mixer, or a dual tub mixer. The mixing equipment 44 can combine a dry ingredient, e.g., cement, with a liquid, e.g., water, for pumping via the pumping equipment 46 into the wellbore 16. The pumping equipment 46 can be a centrifugal pump, piston pump, or a plunger pump. The unit controller 48 may establish control of the operation of the mixing equipment 44 and the pumping equipment 46. The unit controller 48 can operate the mixing equipment 44 and the pumping equipment 46 via one or more commands received from the service personnel as will be described further herein. Although the pump unit 34 is illustrated as a truck, it is understood that the pump unit 34 may be skid mounted or trailer mounted. Although the pump unit 34 is illustrated as a single unit, it is understood that there may be 2, 3, 4, or any number of pump units 34 fluidically coupled to the wellhead 36.

In an embodiment, the pump unit 34 can be a mud pump fluidically connected to the wellbore 16 by the supply line 38. The mixing equipment 44 may blend or mix a dry mud blend with a fluid such as water or oil based fluid. The pump unit 34 may pump drilling mud mixed from dry mud blend and a fluid to the wellbore 16. The pump unit 34 may pump a water based fluid such as a completion fluid also called a completion brine.

In an embodiment, the pump unit 34 can be a blender fluidically connected to one or more high pressure pumping units, also called frac pumps or fracturing pumps. The mixing equipment 44 may blend or mix a proppant, e.g., sand or ceramic beads, with a fracturing fluid to produce frac slurry or fracturing slurry. The fracturing fluid may be water with one or more additives called slick water. The fracturing fluid may be water with a gel additive called gelled fluid. The pump unit 34 can pump the frac slurry to one or more frac pumps or directly to the wellbore 16.

In an embodiment, the pump unit 34 can be a frac pump fluidically connected to the wellbore 16. The pump unit 34 may comprise the pumping equipment 46, e.g., plunger pump, and the unit controller 48. The pump unit 34 can receive a fluid, e.g., frac slurry, from a blender unit and pump the liquid to the wellbore 16.

In an embodiment, the pump unit 34 can be a water supply unit fluidically connected to a mud pump, a blender unit, or a cementing unit. The water supply unit may be part of drilling operation, a cementing operation, or a fracturing operation. The pump unit 34, e.g., water supply unit, may comprise a water supply tank, a pumping equipment 46, and a unit controller 48. The pump unit 34 may pump water from the water supply tank to a mud pump, a blender unit, or a cementing unit.

The pump unit 34 can be a mud pump, a blender, a frac pump, a water supply unit, or a cementing unit. In an illustrative example shown in FIG. 2, the pump unit 34 can be a cementing unit. In an embodiment, the cementing unit, pump unit 100, comprises a supply tank 102, a mixing system 120, a main pump 106, and a power supply 108. The power supply 108 can include one or more electric, gas, or diesel powered motors which are directly or indirectly coupled to the supply tank 102, the mixing system 120, the main pump 106, and the various components such as feed pumps and valves. The power supply 108 may be directly coupled by a drive shaft or indirectly coupled via electrical power supply. The supply tank 102 can provide water to the mixing system 120. The mixing system 120 can blend a fluid composition of water, dry ingredients, e.g., cement, mud, or sand, and other additives for delivery to the wellbore 16 via the main pump 106.

The pump unit 100 may comprise a unit controller 140, a data acquisition system (DAQ) 142, and a display 144. The unit controller 140 may be a computer system comprising one or more processors, memory, input devices, and output devices. The unit controller 140 may have one or more applications executing in memory. The unit controller 140 may be communicatively connected to the pumping equipment and mixing equipment of the pump unit 34. The DAQ card 142, e.g., data acquisition system, may convert one or more analog signals and one or more digital signals into signal data. The DAQ card 142, as illustrated, may be a card or a device within the unit controller 140. In an embodiment, the DAQ card 142 may be communicatively connected to the unit controller 140. The DAQ card 142 may be a standalone system with a microprocessor, memory, and one or more applications executing in memory. In an embodiment, the DAQ card 142 card may be combined with the unit controller 140 into a unitary assembly. The DAQ card 142 may be combined with the input output device 184 of the unit controller 140 when combined into a unitary assembly. The display 144, e.g., interactive display, may be a Human Machine Interface (HMI) that provides an input device and an output device for the unit controller 140. The display 144, e.g., HMI, may include a selectable input screen that includes icons and selectable key board or key pad inputs for the unit controller 140. The display 144 may display data and information about the status and operation of the pump unit 100. The information provided to the service personnel by the display 144 may include sensor data from the DAQ card 142.

The supply tank 102 can store a volume of water or other liquid for the mixing system, e.g., the mixing drum 104. The supply tank 102 can be connected to a water supply unit by a supply line 112, a supply pump 114, and a supply valve 116. The supply pump 114 may be a centrifugal pump, a piston pump, or a plunger pump. The supply valve 116 can be a flow control valve, e.g., a globe valve, a pinch valve, or a needle valve, that can be open, closed, or regulate the fluid flow within. The unit controller 140 may provide power, e.g., voltage and current, and communication to the supply valve 116 and the supply pump 114.

Figure 3:
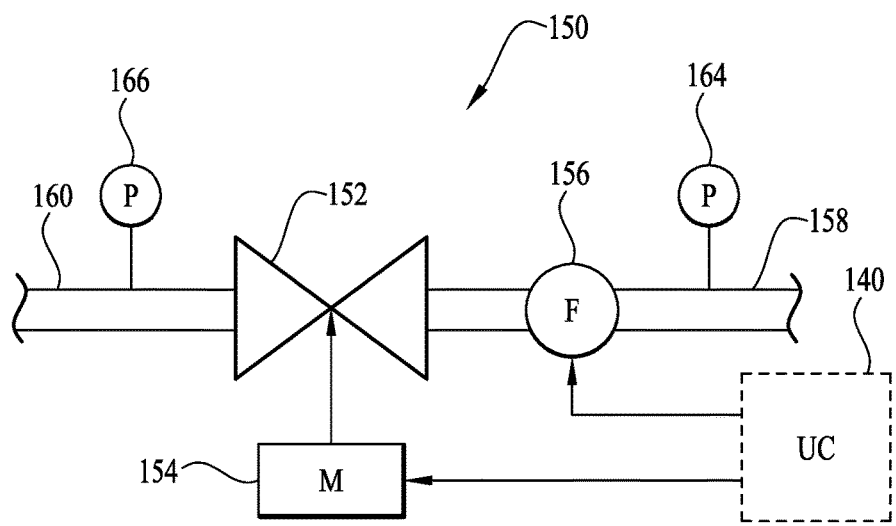
FIG. 3 is an illustration of a valve with control and monitoring components subject to diagnostic testing according to an embodiment of the disclosure.

The supply valve 116 may be flow control valve. Turning now to FIG. 3, an example of a flow control valve 150 may be illustrated. In an embodiment, the flow control valve 150 comprises a throttling valve 152, a valve actuator 154, a flow meter 156, an inlet 158, and an outlet 160. The throttling valve 152 can be a globe valve, a pinch valve, a needle valve, a plug valve, or a slide valve. The valve actuator 154 may be mechanically coupled to the throttling valve 152 and communicatively coupled to the unit controller 140. The flow meter 156 and the positional sensors on the valve actuator 154 may be communicatively connected to the unit controller 140 via the DAQ card 142. The flow control valve 150 may have one or more sensors communicatively connected to the unit controller 140 via the DAQ card 142 including a valve position sensor, a pressure sensor, a flow rate sensor, or combination thereof. For example, the flow meter 156 may be communicatively connected to the DAQ card 142 that is connected to the unit controller 140. The unit controller 140 can open the throttling valve 152 with the valve actuator 154 to a desired position of 25%, 50%, or 100%. Although three values are listed, it is understood that the valve actuator 154 can open the valve to 5%, 10%, 15%, 20%, 25%, or any value between 0% and 100%. The valve actuator 154 may have one or more position sensors communicatively connected to the DAQ card 142. The position sensors may transmit an analog signal to the DAQ card 142 corresponding to the position, e.g., percent open, of the flow control valve 150. The flow meter 156 may be a turbine type flow meter or a Coriolis type flow meter. The flow meter 156 may transmit the flow rate data of the volumetric flow rate of fluid through the supply valve 116 to the unit controller 140 via the DAQ card 142. The flow meter 156 may transmit a frequency signal to the DAQ card 142 corresponding to the volumetric flow rate through the flow meter 156. The unit controller 140 may change the position of the valve 152 with the valve actuator 154 in response to the data from one or more sensors, e.g., flow meter 156. The unit controller 140 may change the pump rate of a pump connected to the inlet 158 of the flow control valve 150 in response to the data from one or more sensors, e.g., flow meter 156. In an embodiment, an upstream pressure sensor 164 can be located along the inlet 158. In an embodiment, a downstream pressure sensor 166 can be located along the outlet 160 of the flow control valve 150. The upstream pressure sensor 164 and the downstream pressure sensor 166 can provide an analog signal corresponding to the measured pressure can be transmitted to the DAQ card 142. The DAQ card 142 may convert the analog signals and frequency signals to digital data corresponding to the measurement transmitted by the sensor to the unit controller 140.

Returning to FIG. 2, the mixing system 120 can include the mixing drum 104, a plurality of additive systems 122, a water pump 124, and a mixing valve 126. The plurality of additive systems 122 may be fluidically connected to a liquid additive supply such as accelerators, retarders, extenders, fluid loss, and viscosity modifiers. The additive systems 122 comprise an additive pump 130, an additive valve 132, and flow meter. The additive pump 130 can be a diaphragm pump, a piston pump, or a centrifugal pump. The additive valve 132 can be an on-off valve such as a ball valve or plug valve. Each additive pump 130 can be communicatively coupled to a corresponding flow meter and the unit controller 140 via the DAQ card 142. The unit controller 140 can dispense a predetermined volume of additive by controlling the additive pump 130 and additive valve 132 with the flow rate data from the flow meter. The water pump 124 and supply valve 170 can regulate the volumetric flow rate liquid from the supply tank 102. The supply valve 170 can be a flow control valve, e.g., flow control valve 150 described in FIG. 3. The unit controller 140 may change the pump rate of the water pump 124 and the valve position of the supply valve 170 in response to the data from one or more sensors, e.g., flow meter 156 shown in FIG. 3. The mixing system 120 can include a mixing valve 126 located downstream from the mixing drum 104. The mixing valve 126 can be a flow control valve as shown in FIG. 3 or an isolation valve, e.g., a ball valve or plug valve.

The main pump 106 may be a centrifugal pump, a piston pump, or a plunger pump. In the cementing unit disclosed as pump unit 100 in FIG. 2, the main pump 106 can be a centrifugal pump. The main pump 106 may be a piston pump when the pump unit 100 is a mud pump. The main pump 106 may be a plunger pump when the pump unit 100 is a frac pump. The power supply 108 may actuate the main pump 106. The slurry mixed within the mixing drum 104 is transferred to the main pump 106 via the mixing valve 126.

The main pump 106 may have a main valve 172 coupled to the outlet of the main pump 106. The main valve 172 may be a stand-alone valve or may be a portion of a discharge manifold. A discharge manifold may have one or more flow valves and one or more isolation valves. The main valve 172 can be a flow control valve, e.g., flow control valve 150 described in FIG. 3 or an isolation valve such as a plug valve or ball valve. The unit controller may be communicatively coupled to the main pump 106 and the main valve 172 to the unit controller 140. The unit controller 140 may change the pump rate of the main pump 106 and the valve position of the main valve 172 in response to the data from one or more sensors, e.g., flow meter 156 shown in FIG. 3.

Figure 2:
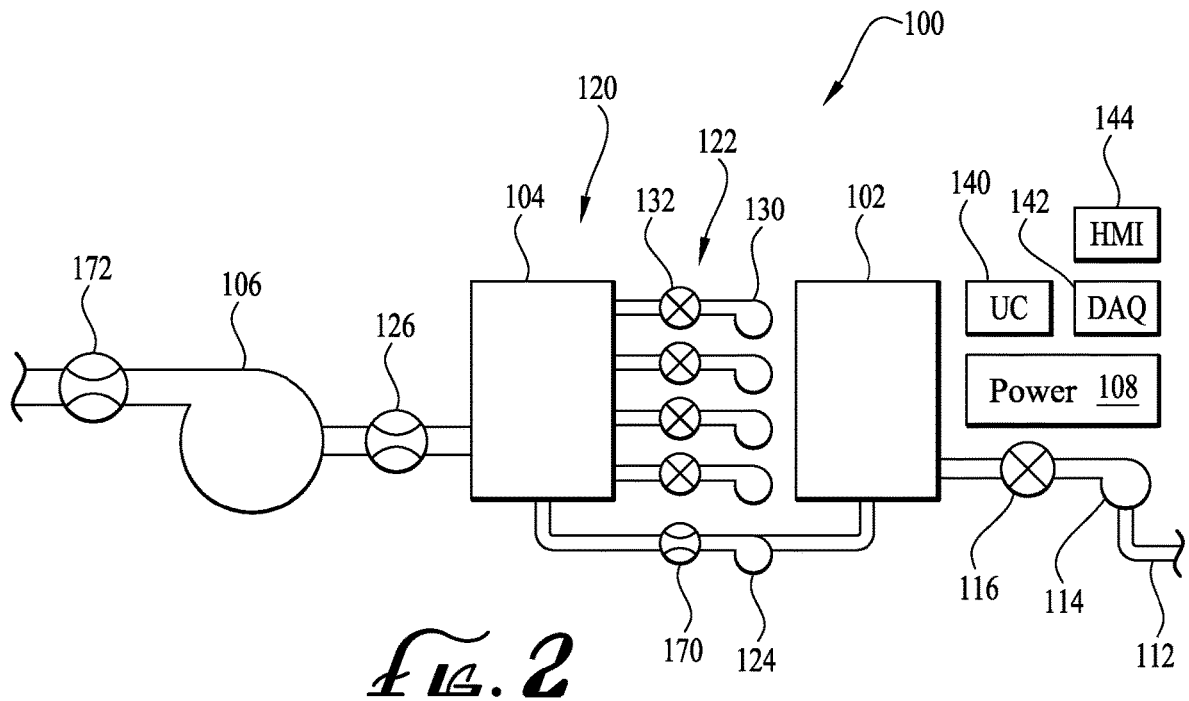
FIG. 2 is an illustration of a pump unit assembly according to an embodiment of the disclosure.

Although the pump unit 100 of FIG. 2 is described as a cement pumping unit, it is understood that the pump unit 100 may be a mud pump, a blender, a frac pump, or a water supply. Each type of pump unit, e.g., a mud pump, a cement pump unit, a blender, a frac pump, or a water supply, may include a main pump, e.g., 106, a flow control valve, e.g., 150, and a unit controller, e.g., 140. The unit controller, e.g., 140, may receive data via a DAQ card 142. The unit controller 140 of the pump unit, e.g., 100, may be communicatively connected to one or more pump units, e.g., 100, at the wellsite. The pump unit, e.g., 100, may work in concert with at least one more pump unit, e.g., 100. In a scenario, the pump unit 100 may be controlled, via the unit controller 140, by a control system at the wellsite. The pump unit 100 may be communicatively connected to a control system at the wellsite.

Figure 4:
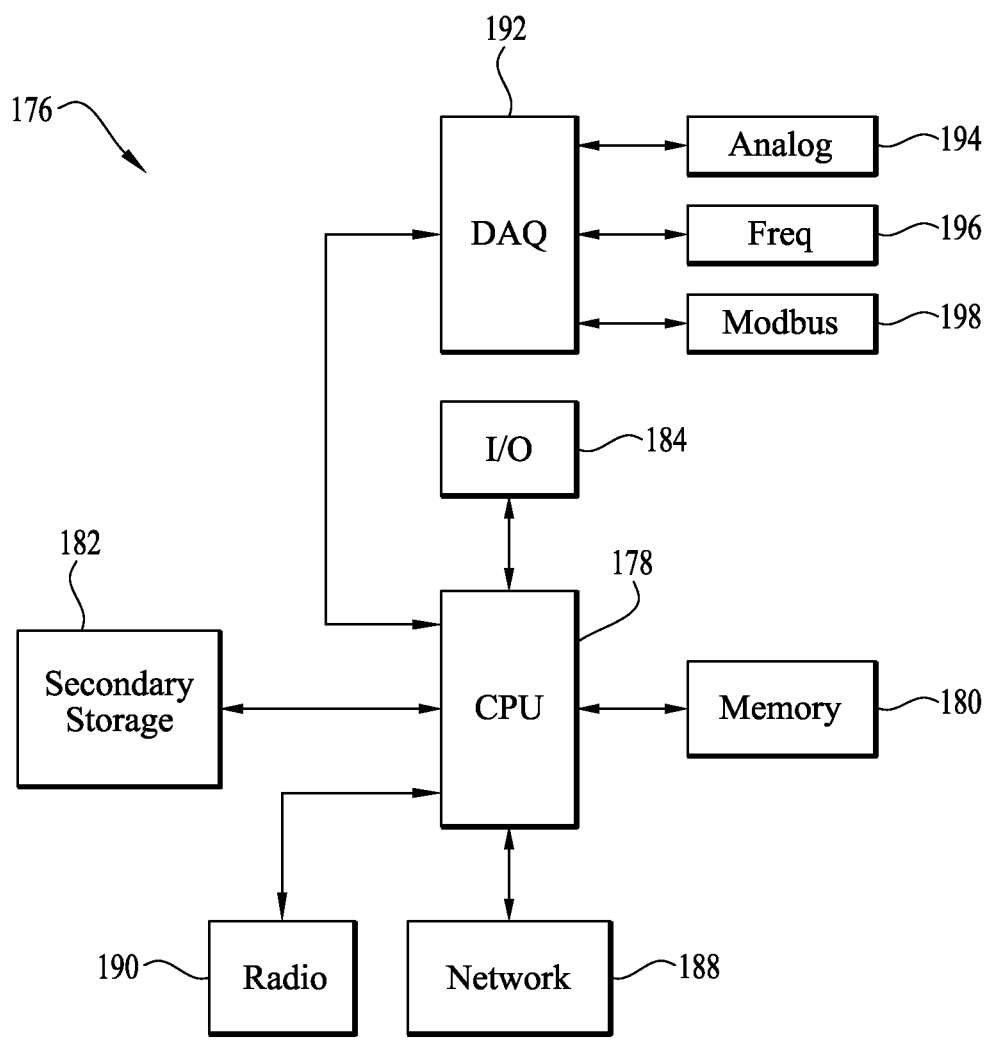
FIG. 4 is a block diagram of a unit controller according to an embodiment of the disclosure.

The unit control may be a computer system suitable for communication and control of the pumping unit. In FIG. 1, the unit controller 48 may establish control of the operation of the mixing equipment 44 and the pumping equipment 46 of the pump unit 34. In FIG. 2, the unit controller 140 may establish control of the operation of the mixing system 120 and the main pump 106 of the pump unit 100. In an embodiment, the unit controller 48 & 140 may be an exemplary computer system 176 described in FIG. 4. Turning now to FIG. 4, a computer system 176 suitable for implementing one or more embodiments of the unit controller, for example 48 & 140, including without limitation any aspect of the computing system associated with pump unit 34 of FIG. 1 and pump unit 100 of FIG. 2 and any aspect of a unit control as shown as unit controller 48 in FIG. 1 and unit controller 140 in FIG. 2. The computer system 176 includes one or more processors 178 (which may be referred to as a central processor unit or CPU) that is in communication with memory 180, secondary storage 182, input output devices 184, DAQ 192, and network devices 188. The computer system 176 may continuously monitor the state of the input devices and change the state of the output devices based on a plurality of programmed instructions. The programming instructions may comprise one or more applications retrieved from memory 180 for executing by the processor 178 in non-transitory memory within memory 180. The input output devices may comprise a HMI, e.g., display 144 in FIG. 2, with a display screen and the ability to receive conventional inputs from the service personnel such as push button, touch screen, keyboard, mouse, or any other such device or element that a service personnel may utilize to input a command to the computer system 176. The secondary storage 182 may comprise a solid state memory, a hard drive, or any other type of memory suitable for data storage. The secondary storage 182 may comprise removable memory storage devices such as solid state memory or removable memory media such as magnetic media and optical media, i.e., CD disks. The computer system 176 can communicate with various networks with the network devices 188 comprising wired networks, e.g., Ethernet or fiber optic communication, and short range wireless networks such as Wi-Fi (i.e., IEEE 802.11), Bluetooth, or other low power wireless signals such as ZigBee, Z-Wave, 6LoW-Pan, Thread, and WiFi-ah. The computer system 176 may include a long range radio transceiver 190 for communicating with mobile network providers as will be disclosed further herein.

The computer system 176 may comprise a DAQ card 192 for communication with one or more sensors. The DAQ card 192 may be a stand alone system with a microprocessor, memory, and one or more applications executing in memory. The DAQ card 192, as illustrated, may be a card or a device within the computer system 176. In an embodiment, the DAQ card 192 may be combined with the input output device 184. The DAQ card 192 may receive one or more analog inputs 194, one or more frequency inputs 196, and one or more Modbus inputs 198. For example, the analog input 194 may include a tub level sensor. For example, the frequency input 196 may include a flow meter, i.e., 156 from FIG. 3. For example, the Modbus input 198 may include a pressure transducer, i.e., 164 from FIG. 3. The DAQ card 192 may convert the signals received via the analog input 194, the frequency input 196, and the Modbus input 198 into the corresponding sensor data. For example, the DAQ card 192 may convert a frequency input 196 from the flow meter 156 shown in FIG. 3 into flow rate data measured in gallons per minute (GPM).

The unit controller may initiate, initialize, or start-up a diagnostic procedure with an application that runs when the unit controller is turned on. In an embodiment, the unit controller, e.g., 140 in FIG. 2, may perform a diagnostic procedure during a start-up procedure initiated or initialized by powering up the unit controller 140. When the service personnel starts up the pump unit, e.g., 100 in FIG. 2, the unit controller 140 can be powered up, powered on, or turned on. When the unit controller 140, also illustrated as 176 in FIG. 4, is powered up, e.g., activated, an diagnostic application can be executed in non-transitory memory 180 by the processor 178. The diagnostic application can check the status of the input output devices 184, the network devices 188, the long range radio transceiver 190, and the DAQ card 192. The results of the status check of the diagnostic application can be logged into memory 180, a secondary storage 182, and displayed on Human Machine Interface (HMI), e.g., the control display.

In some embodiments, the diagnostic application may check the status of the secondary storage 182. The diagnostic application may create a folder, a diagnostic results file, or combination thereof. The diagnostic application may return an error status if the secondary storage is locked access, e.g., write protected. The diagnostic application may generate a diagnostic log report file in memory 180 with the results of the status of the secondary storage 182.

In some embodiments, the diagnostic application may access a unique serial number for the unit controller, e.g., 140 in FIG. 2. The diagnostic application may access a version history for the diagnostic application. The diagnostic application may access the date and time from an application executing in memory 180. The diagnostic application may write a date stamp, a time stamp, version of the diagnostic application, and the unique serial designation for the unit controller to the diagnostic log report.

In some embodiments, the diagnostic application may check the status of the network devices 188. The diagnostic application may check that the network devices 188 are installed and functioning. For example, the diagnostic application may initiate connection to one or more network cards that provide network services such as Ethernet and fiber optic communication. The diagnostic application may step through a sub-routine to connect each network device 188 to the network. For example, the diagnostic application may connect the wired connection, e.g., Ethernet, to a wired network. The diagnostic application may connect the network devices 188 to one or more short range wireless networks such as Wi-Fi (i.e., IEEE 802.11), Bluetooth, or other low power wireless signals such as ZigBee, Z-Wave, 6LoWPan, Thread, and WiFi-ah. The diagnostic application may return a pass/fail for the connection to the one or more network cards. The diagnostic application may return a status of connected or not connected for each network device 188, e.g., Ethernet. The diagnostic application may write the results of the status of the network devices 188 to the diagnostic log report.

In some embodiments, the diagnostic application may check the status of the input output devices 184. The diagnostic application may check the connectivity between the HMI, e.g., 144 in FIG. 2, and the input output devices 184. The diagnostic application may access the software version history of the interactive display 144. In one or more embodiments, the diagnostic application may check the connectivity between a plurality of inputs devices, e.g., a second HMI, keyboard, keypad, touch screen, etc., and the input output devices 184. The diagnostic application may return a pass/fail status for each connection, e.g., passing status or failing status. The diagnostic application may write the results of the status of the input output devices 184 and the HMI software version to the diagnostic log report.

In some embodiments, the diagnostic application may check the status of the analog input 194 attached to the DAQ card 192. The pump unit 100 may have a plurality of analog sensors, e.g., pressure sensors, with analog signals communicatively connected to the DAQ card 192. For example, one or more pressure sensors, e.g., 164 in FIG. 3, may transmit an analog signal. The diagnostic application may check the analog inputs of the pressure sensors, valve position sensors, and tub level sensors sequentially beginning with the first sensor connection of the analog input 194 connected to the DAQ card 192. The diagnostic application may return a pass/fail status for each connection. The diagnostic application may write the results of the status of the analog inputs 194 to the diagnostic log report.

In some embodiments, the diagnostic application may check the status of the frequency input 196 attached to the DAQ card 192. The pump unit 100 may have a plurality of frequency sensors, e.g., flow meters, with frequency signals communicatively connected to the DAQ card 192. For example, one or more flow meters, e.g., 156 in FIG. 3, may transmit a frequency signal. The diagnostic application may check the frequency inputs of the flow meters sequentially beginning with the first sensor connection of the frequency input 196 connected to the DAQ card 192. In an aspect, one or more pumps, e.g., main pump 106, on the pump unit 100 may include a stroke counter (pump stroke counter) that transmits a frequency signal to the frequency input 196 connected to the DAQ card 192. In an aspect, a frequency sensor may be a position sensor such as an revolutions per minute (RPM) sensor or a pump stroke sensor. The stroke counter, the pump stroke counter, the RPM sensor may be referred to as position sensors. The diagnostic application may return a pass/fail status for each connection. The diagnostic application may write the results of the status of the frequency inputs 196 to the diagnostic log report.

In some embodiments, the diagnostic application may check the Modbus input 198 attached to the DAQ card 192. The pump unit 100 may have a plurality of Modbus sensors, e.g., density meters, with Modbus signals communicatively connected to the DAQ card 192. The diagnostic application may check the Modbus inputs of the density meters sequentially beginning with the first sensor connection of the Modbus input 198 connected to the DAQ card 192. The diagnostic application may return a pass/fail status for each connection. The diagnostic application may write the results of the status of the Modbus inputs 198 to the diagnostic log report.

In some embodiments, the diagnostic application may access a plurality of calibration data stored in memory 180. The diagnostic application may survey the equipment communicatively connected to the DAQ card 142 for equipment, e.g., flow meters, that require calibration data. The diagnostic application may access the calibration files stored in memory 180 and may pair the equipment with the corresponding calibration file. The diagnostic application may return a pass/fail status for calibration data file not found. The diagnostic application may write the results of the status of the calibration data to the diagnostic log report.

In some embodiments, the diagnostic application may determine the location of the pump unit, e.g., 204. The diagnostic application may connect the long range radio transceiver 190 to a mobile communication network to establish a geographical location of the pump unit. The mobile carrier network 254 may provide the geographical location based on a triangulated signal or a digital map of the service area. The diagnostic application may write the geographic location of the unit controller 140 and pump unit, e.g., 34, to the diagnostic log report.

In some embodiments, the diagnostic application may generate a diagnostic log file of the results in memory 180 and transfer a second diagnostic log file to the secondary storage 182. The diagnostic application may generate a diagnostic log of the results from the plurality of sensor checks previously disclosed. For example, the diagnostic application may generate a diagnostic log file of the pass/fail condition of each of the analog inputs sequentially in the log file. The log file may be stored in memory 180 and in the secondary storage 182.

In some embodiments, the diagnostic application may display the results on the display 144, e.g., HMI, on FIG. 2. The results from the diagnostic application can be a simple pass or fail displayed as colors, e.g., color indicator, or text message. A failure message may be included when the result is a fail. The failure message may include the sensor location, identification, type, or a combination thereof.

In some embodiments, the diagnostic application may connect the long range radio transceiver 190 to a mobile carrier network 254 and transmit the diagnostic log to a remote service center as will be described further therein.

Figure 5:
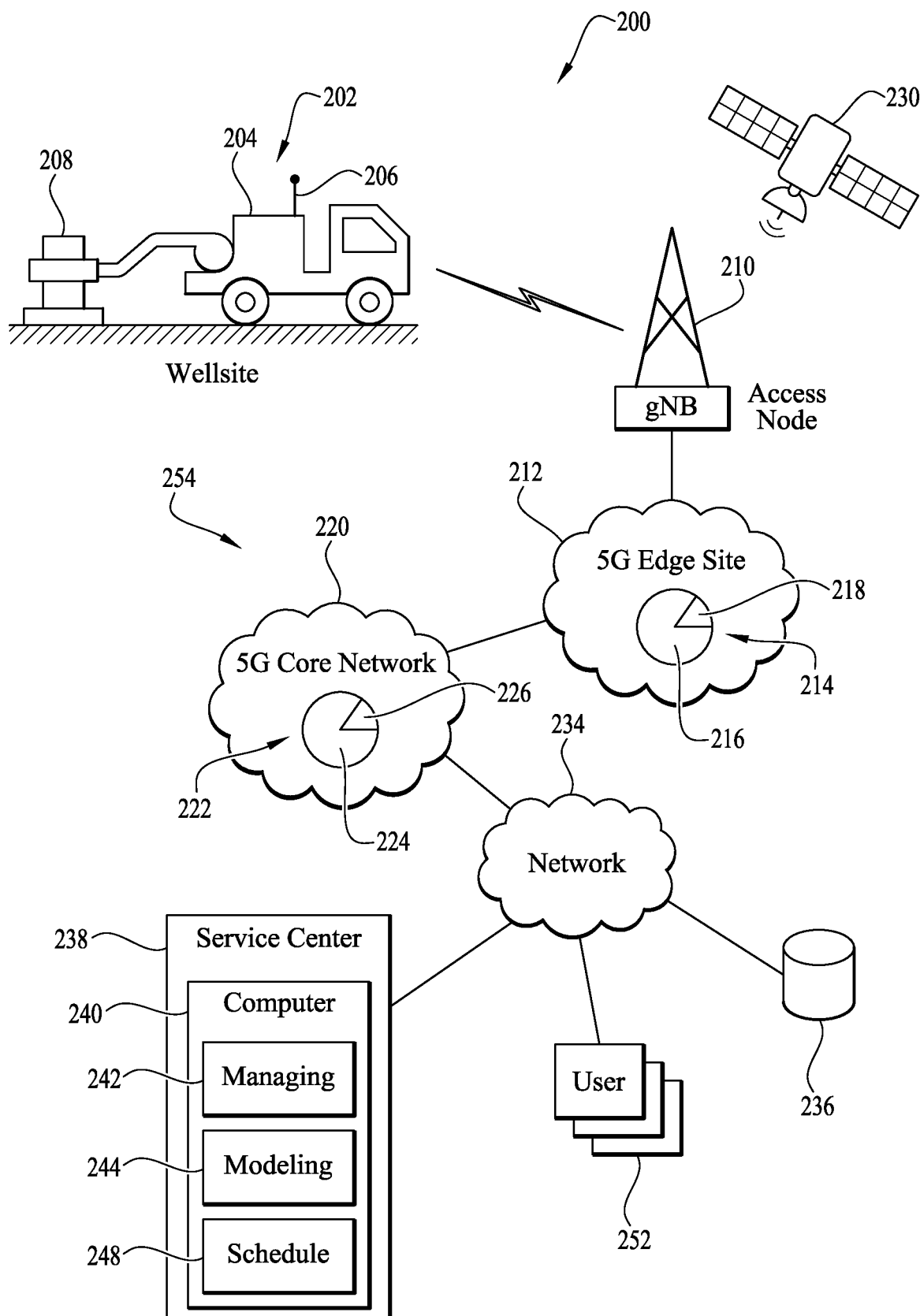
FIG. 5 is an illustration of a communication system according to an embodiment of the disclosure.

Data can be transmitted and received by various wired or wireless means between a service center and the pump unit 100 at a remote wellsite location for further processing. Turning now to FIG. 5, a data communication system 200 is described. The data communication system 200 comprises a wellsite 202 (where the pump unit 34 of FIG. 1 can be located), an access node 210 (e.g., cellular site), a mobile carrier network 254, a network 234, a storage computer 236, a service center 238, and a plurality of user devices 252. A wellsite 202 can include a pump unit 204 as part of a well construction operation pumping a service fluid into the wellhead 208 (e.g., 36 in FIG. 1). The pump unit 204 can include a communication device 206 (e.g., transceiver 190 of FIG. 4) that can transmit and receive via any suitable communication means (wired or wireless), for example, wirelessly connect to an access node 210 to transmit data (e.g., diagnostic log) to a storage computer 236. The storage computer 236 may also be referred to as a data server, data storage server, or remote server. The storage computer 236 may include a database of diagnostic test results. Wireless communication can include various types of radio communication, including cellular, satellite 230, or any other form of long range radio communication. The communication device 206 can transmit data via wired connection for a portion or the entire way to the storage computer 236. The communication device 206 may communicate over a combination of wireless and wired communication. For example, communication device 206 may wirelessly connect to access node 210 that is communicatively connected to a network 234 via a mobile carrier network 254.

In some embodiments, the communication device 206 on the pump unit 204 is communicatively connected to the mobile carrier network 254 that comprises the access node 210, a 5G edge site 212, a 5G core network 220, and the network 234. The communication device 206 may be the transceiver 190 connected to the computer system 176 of FIG. 4. The computer system 176 may be the unit controller 140 of FIG. 2 or unit controller 48 of FIG. 1, thus the communication device 206 may be communicatively connected to the unit controller 140 & 48.

The access node 210 may also be referred to as a cellular site, cell tower, cell site, or, with 5G technology, a gigabit Node B. The access node 210 provides wireless communication links to the communication device 206, e.g., UC 140 & 48, according to a 5G, a long term evolution (LTE), a code division multiple access (CDMA), or a global system for mobile communications (GSM) wireless telecommunication protocol.

The communication device 206 may establish a wireless link with the mobile carrier network 254 (e.g., 5G core network 220) with a long-range radio transceiver, e.g., 190 of FIG. 4, to receive data, communications, and, in some cases, voice and/or video communications. The communication device 206 may also include a display and an input device (e.g., interactive display 144 or HMI), a camera (e.g., video, photograph, etc.), a speaker for audio, or a microphone for audio input by a user. The long-range radio transceiver, e.g., 190, of the communication device 206 may be able to establish wireless communication with the access node 210 based on a 5G, LTE, CDMA, or GSM telecommunications protocol. The communication device 206 may be able to support two or more different wireless telecommunication protocols and, accordingly, may be referred to in some contexts as a multi-protocol device. The communication device 206, e.g., 206A, may communicate with another communication device, e.g., 206B, on a second pump truck, e.g., 204B, via the wireless link provided by the access node 210 and via wired links provided by the mobile carrier network 254, e.g., 5G edge site 212 or the 5G core network 220. Although the pump unit 204 and the communication device 206 are illustrated as a single device, the pump unit 204 may be part of a system of pump units, e.g., a frac fleet. For example, a pump unit 204A may communicate with pump units 204B, 204C, 204D, 204E, and 204F at the same wellsite, e.g., 202 of FIG. 5, or at multiple wellsites. In an embodiment, the pump units 204A-E may be a different types of pump units at the same wellsite or at multiple wellsites. For example, the pump unit 204A may be a frac pump, pump unit 204B may be a blender, pump unit 204C may be water supply unit, pump unit 204D may be a cementing unit, and pump unit 204E may be a mud pump. The pump unit 204A-F may be communicatively coupled together at the same wellsite by one or more communication methods. The pump units 204A-F may be communicatively couple with a combination of wired and wireless communication methods. For example, a first group of pump units 204A-C may be communicatively coupled with wired communication, e.g., Ethernet. A second group of pump units 204D-E may be communicatively couple to the first group of pump units 204A-C with low powered wireless communication, e.g., WIFI. A third group of pump units 204F may be communicatively coupled to one or more of the first group or second group of pump units by a long range radio communication method, e.g., mobile communication network.

The 5G edge site 212 can be communicatively coupled to the access node 1210. The 5G edge site 212 may also be referred to as a regional data center (RDC) and can include a virtual network in the form of a cloud computing platform. The cloud computing platform can create a virtual network environment from standard hardware such as servers, switches, and storage. The total volume of computing availability 214 of the 5G edge site 212 is illustrated by a pie chart with a portion illustrated as a network slice 218 and the remaining computing availability 216. The network slice 218 represents the computing volume available for storage or for processing of data. The network slice 218 may be referred to as a network location. The cloud computing environment is described in more detail, further hereinafter. Although the 5G edge site 212 is shown communicatively coupled to the access node 210, it is understood that the 5G edge site 212 may be communicatively coupled to a plurality of access nodes (e.g., 210). The 5G edge site 212 may receive all or a portion of the voice and data communications from one or more access nodes (e.g., 210). The 5G edge site 212 may process all or a portion of the voice and data communications or may pass all or a portion to the 5G core network 220 as will be described further hereinafter. Although the virtual network is described as created from a cloud computing network, it is understood that the virtual network can be formed from a network function virtualization (NFV). The NFV can create a virtual network environment from standard hardware such as servers, switches, and storage. The NFV is more fully described by ETSI GS NFV 002 v1.2.1 (2014-12).

The 5G core network 220 can be communicatively coupled to the 5G edge site 212 and provide a mobile communication network via the 5G edge site 212 and one or more access node 210. Although the access node 210 is illustrated as communicatively connected to the 5G edge site 212, it is understood that one or more access nodes, e.g., 210, may be communicatively connected to the 5G core network 220. The 5G core network 220 can include a virtual network in the form of a cloud computing platform. The cloud computing platform can create a virtual network environment from standard hardware such as servers, switches, and storage. The total volume of computing availability 222 of the 5G core network 220 is illustrated by a pie chart with a portion illustrated as a network slice 226 and the remaining computing availability 224. The network slice 226 may be referred to as a network location. The network slice 226 represents the computing volume available for storage or processing of data. The cloud computing environment is described in more detail further hereinafter. Although the 5G core network 220 is shown communicatively coupled to the 5G edge site 212, it is understood that the 5G core network 220 may be communicatively coupled to a plurality of access nodes (e.g., 210) in addition to one or more 5G edge sites (e.g., 212). The 5G core network 220 may be communicatively coupled to one or more Mini Data Centers (MDC). MDC may be generally described as a smaller version or self-contained 5G edge site comprising an access node, e.g., 210, with a cloud computing platform, e.g., a virtual network environment, created from standard computer system hardware, e.g., processors, switches, and storage. The 5G core network 220 may receive all or a portion of the voice and data communications via 5G edge site 212, one or more MDC nodes, and one or more access nodes (e.g., 122). The 5G core network 220 may process all or a portion of the voice and data communications as will be described further hereinafter. Although the virtual network is described as created from a cloud computing network, it is understood that the virtual network can be formed from a network function virtualization (NFV). The NFV can create a virtual network environment from standard hardware such as servers, switches, and storage.

A storage computer 236 can be communicatively coupled to the 5G network, e.g., mobile carrier network 254, via the network 234. The storage computer 236 can be a computer, a server, or any other type of storage device. The storage computer 236 may be referred to as a network location. The network 234 can be one or more public networks, one or more private networks, or a combination thereof. A portion of the Internet can be included in the network 234.

A service center 238 may be a base of operations and provide maintenance for the pump unit 204. The maintenance for the pump unit 204 can include repair, replacement, modification, upgrades, or a combination thereof of the equipment on the pump unit 204 including the unit controller 140, the DAQ card 142, the interactive display 144, i.e., HMI, the power supply 108, the supply tank 102, the mixing system 120, the additive system 122, the main pump 106, the plurality of pumps, e.g., 114, the plurality of valves, e.g., 150, the plurality of sensors, e.g., 156, or combinations thereof. For example, the service center 238 may provide maintenance for the main pump 106 including repair, replacement, modification, or an upgrade. In a scenario, the service center 238 may replace one or more seals within the main pump 106. The replacement of the seals may be based on a schedule or on a repair request.

The service center 238 may have a maintenance application 242 for the pump unit, e.g., 204, executing on a central computer 240. The maintenance application 242 may assign a pump unit, e.g., 204, for maintenance to one or more components on the pump unit, e.g., main pump 106, by assigning the pump unit, e.g., 204, on the maintenance schedule 248. The assignment of the pump unit, e.g., 204, to the schedule 248 may be for repair, replacement, or modification of one or more components. In an embodiment, the maintenance application 242 may retrieve a diagnostic log from the storage computer 236 associated with the pump unit 204. In an embodiment, the maintenance application 242 may retrieve a diagnostic log from a database on the storage computer 236. The diagnostic log may include an alert that a diagnostic test of one or more components has returned a fault value or error value. For example, the diagnostic log may include a notification that a tub level sensor is not functioning. The diagnostic log may include an alert that a diagnostic test of one or more components has returned a value below a threshold value. For example, the diagnostic log may include an alert that the Modbus check has returned an instrument, e.g., density sensor, with data out of range. The maintenance application 242 may alert one or more user devices 252 communicatively connected to the maintenance application 242 via the network 234. The maintenance application 242 may assign the pump unit 204 onto the schedule 248 for repair, replacement, or modification of the component that generated the alert on the diagnostic log retrieved from the storage computer 236. In an embodiment, the diagnostic log may be transmitted from the communication device 206 of the pump unit 204 to the maintenance application 242 executing on the central computer 240 via the mobile carrier network 254. In an embodiment, the maintenance application 242 may include a database of diagnostic test results. In an embodiment, the central computer 240 may include a database of diagnostic test results.

Although the maintenance application 242 is described as executing on a central computer 240, it is understood that the central computer 240 can be a computer system or any form of a computer system such as a server, a workstation, a desktop computer, a laptop computer, a tablet computer, a smartphone, or any other type of computing device. The central computer 240 (e.g., computer system) can include one or more processors, memory, input devices, and output devices, as described in more detail further hereinafter. Although the service center 238 is described as having the maintenance application 242 executing on a central computer 240, it is understood that the service center 238 can have 2, 3, 4, or any number of computers 240 (e.g., computer systems) with 2, 3, 4, or any number of maintenance applications 242 or second applications 244 (e.g., modeling application) executing on the central computers 240.

Figure 6:
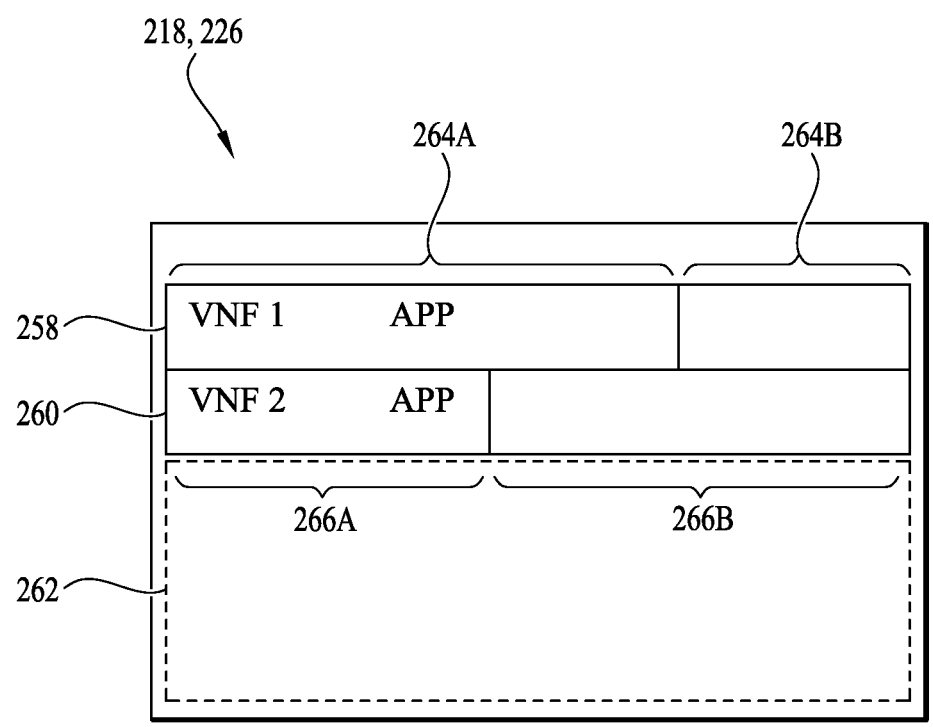
FIG. 6 is a block diagram of an application within a virtual network function on a network slice according to an embodiment of the disclosure.
Figure 7A:
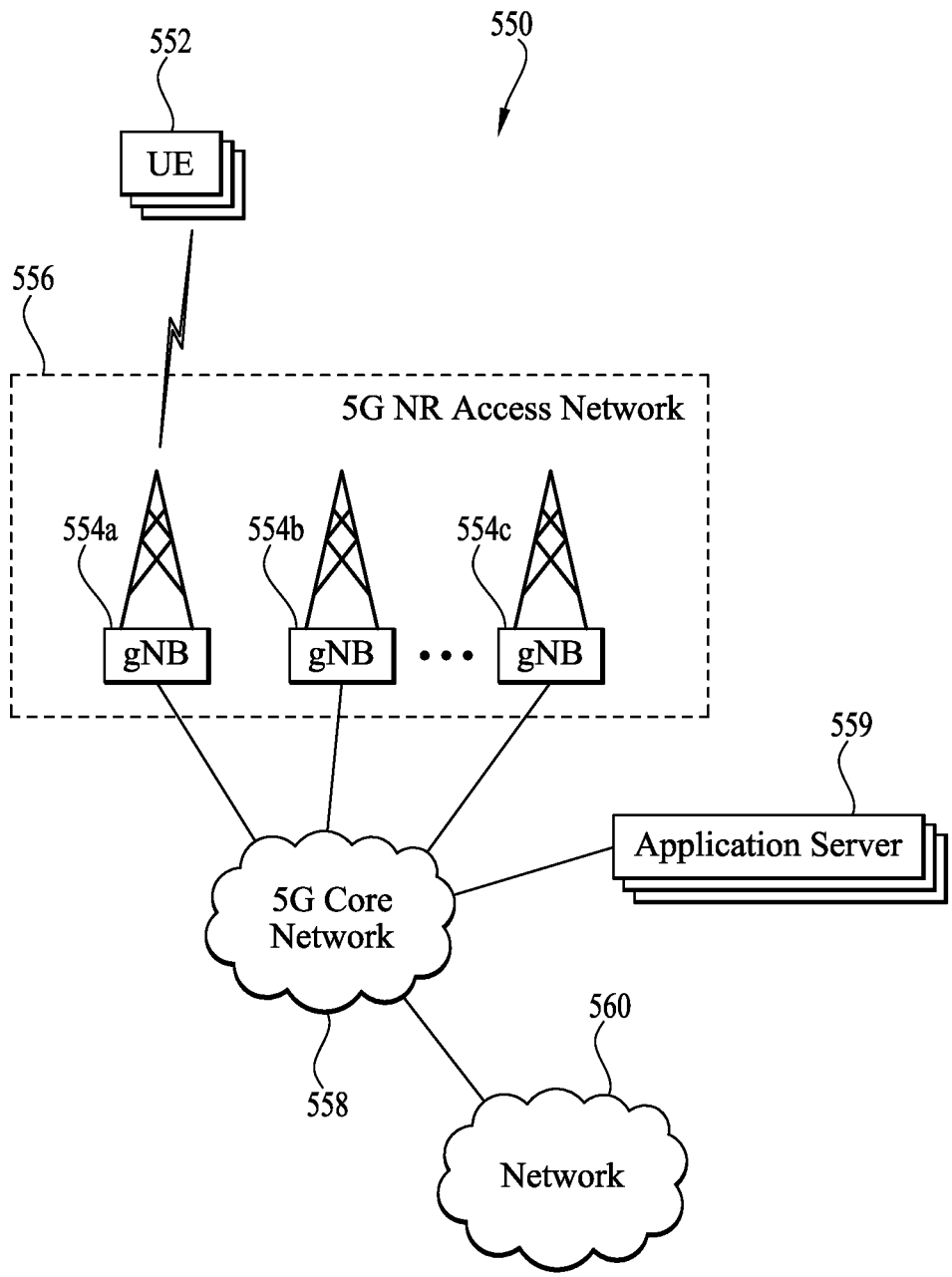
FIG. 7A is a block diagram of an exemplary communication system according to an embodiment of the disclosure.
Figure 7B:
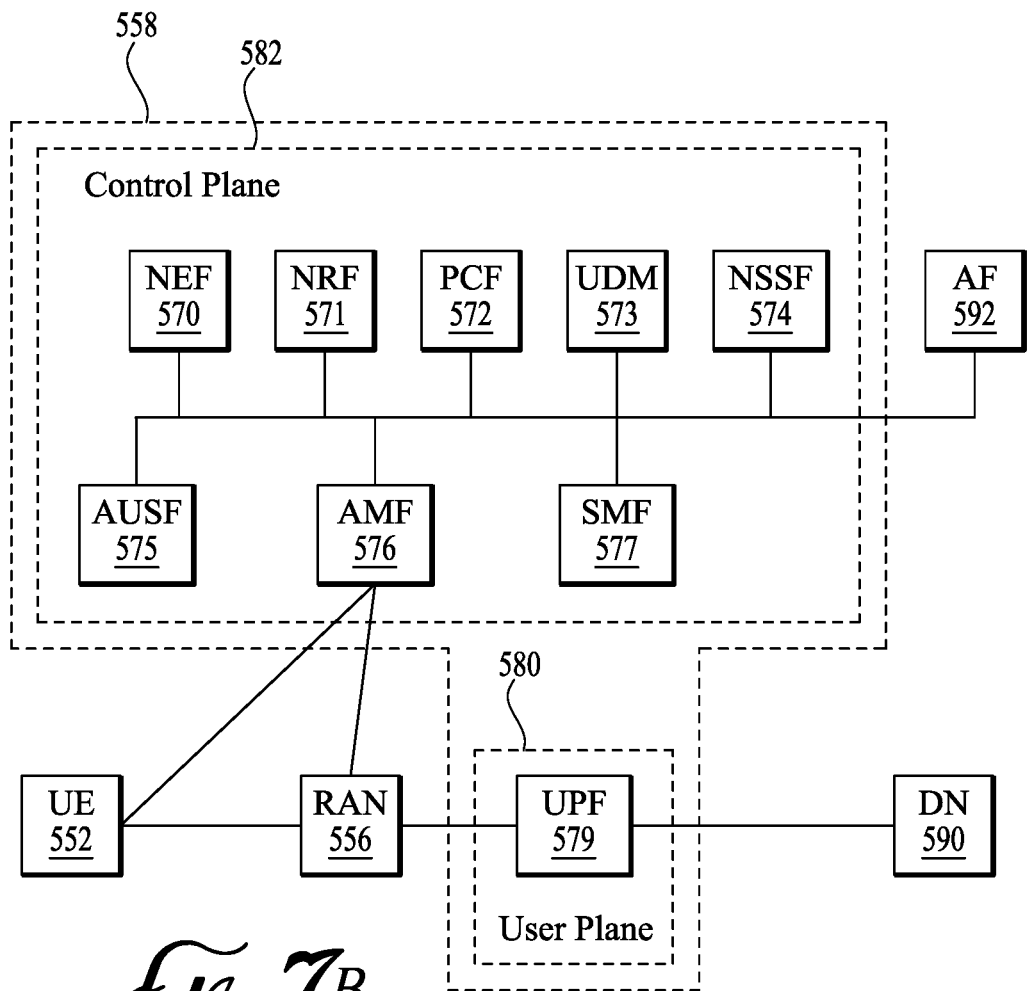
FIG. 7B is a block diagram of a 5G core network according to an embodiment of the disclosure.
Figure 8:
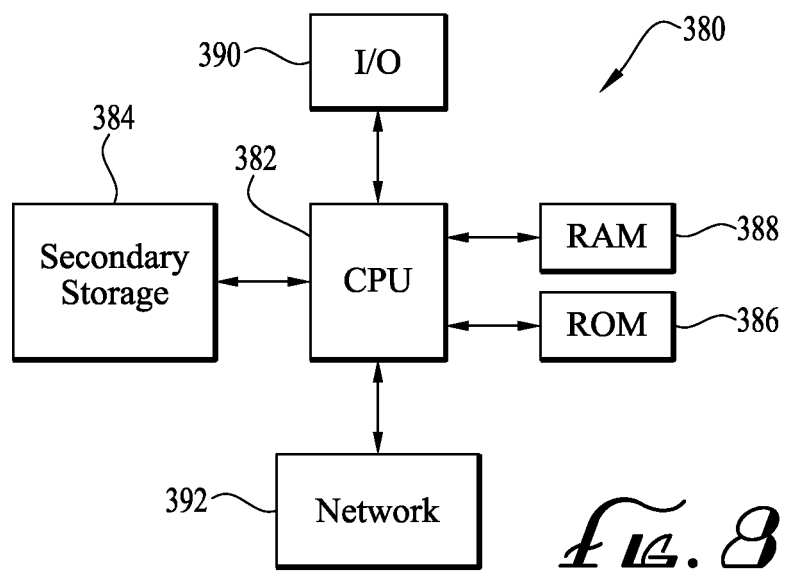
FIG. 8 is a block diagram of a computer system according to an embodiment of the disclosure.

In an aspect, the mobile carrier network 254 includes a 5G core network 220 and a 5G edge site 212 with virtual servers in a cloud computing environment. One or more servers of the type disclosed herein, for example, storage computer 236 and central computer 240, can be provided by a virtual network function (VNF) executing within the 5G core network. The pump unit 204 on the wellsite 202 can be communicatively coupled to the 5G edge site 212, which includes the 5G core network 220 via the access node 210 (e.g., gigabit Node B) and thus can be communicatively coupled to one or more VNFs with virtual servers as will be more fully described hereinafter. Turning now to FIG. 6, a representative example of a network slice 218 & 226 is described. A computing service executing on network slice 218 & 226 can comprise a first virtual network function (VNF) 258, a second VNF 260, and an unallocated portion 262. The computing service can comprise a first application 264A executing on a first VNF 258 and a second application 266A executing on a second VNF 260. The first application 264A and second application 266A can be computing service applications generally referred to as remote applications. The total computing volume can comprise a first VNF 258, a second VNF 260, and an unallocated portion 262. The unallocated portion 262 can represent computing volume reserved for future use. The first VNF 258 can include a first application 264A and additionally allocated computing volume 264B. The second VNF 260 can include a second application 266A and additionally allocated computing volume 266B. Although two VNFs are illustrated, the network slice 218 & 226 can have a single VNF, two VNFs, or any number of VNFs. Although the first VNF 258 and second VNF 260 are illustrated with equal computing volumes, it is understood that the computing volumes can be non-equal and can vary depending on the computing volume needs of each application. The first application 264A executing in the first VNF 258 can be configured to communicate with or share data with the second application 266A executing in the second VNF 260. The first application 264A and second application 266A can be independent and not share data or communicate with each other. Although the network slice 218 & 226 is illustrated with two VNFs and an unallocated portion 262, the network slice 218 & 226 may be configured without an unallocated portion 262. Although only one application, a first application 264A, is described executing within the first VNF 258, two or more applications can be executing within the first VNF 258 and second VNF 260. In an embodiment, the network slice 218 & 226 may be the network slice 218 on the 5G edge site 212. In an embodiment, the network slice 226 may be the network slice 226 on the 5G core network 220. In an embodiment, the maintenance application 242 may be first application 264A executing on the first VNF 258. In an embodiment, the schedule 248 may be a second application executing on the first VNF 258. In an embodiment, the storage computer 236 may be second application 266A executing on the second VNF 260. In an embodiment, the database of diagnostic test files may be second application 266A executing on the second VNF 260.

Turning now to FIG. 14A, an exemplary communication system 550 is described suitable for implementing one or more embodiments disclosed herein, for example implementing communications or messaging as disclosed herein including without limitation any aspect of wireless communication between communication device 206 and mobile carrier network 254 on FIG. 5; any aspect of communications with the computing components and network associated with FIG. 4 (e.g., long range radio transceiver 190); etc. Typically, the communication system 550 includes a number of access nodes 554 that are configured to provide coverage in which UEs 552 such as cell phones, tablet computers, machine-type-communication devices, unit controllers, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (.e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Turning now to FIG. 14B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

FIG. 15 illustrates a computer system 380 suitable for implementing one or more embodiments disclosed herein, for example implementing one or more computers, servers or the like as disclosed or used herein, including without limitation any aspect of the computing system associated with pump unit 100 (e.g., unit controller 140); any aspect of the computing components and network associated with FIG. 5 (e.g., central computer 240); any aspect of a computer system as shown in FIG. 4 (e.g., computer system 176); etc. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID),. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k* (Ru-Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of automating a diagnostic procedure executing on a computer system on a wellbore pump unit, comprising:
    applying power to a unit controller comprising a processor, a non-transitory memory, at least one network device, a secondary storage device, and an input output device;
    generating, by a diagnostic application, a diagnostic report file in the memory of the unit controller, wherein the diagnostic report file comprises a pass/fail status of a plurality of analog inputs, wherein the analog inputs comprise a plurality of analog sensors, and wherein the analog sensors comprises a plurality of pressure sensors, a plurality of valve position sensors, a plurality of tub level sensors, or combination thereof;
    writing, by the diagnostic application, to the diagnostic report file a pass/fail status of the secondary storage device, wherein a write access is a passing status and a locked access is a failing status; and
    displaying, by the diagnostic application, the pass/fail statuses in the diagnostic report file via the input output device; wherein the input output device comprises an interactive display, and wherein the pass/fail statuses comprise a color indicator, a text message, or combination thereof.

2. The method of claim 1, further comprising:
    writing, by the diagnostic application, to the diagnostic report file a pass/fail status of a plurality of frequency inputs, wherein the frequency inputs comprise a plurality of frequency sensors, and wherein the frequency sensors comprise a plurality of flow meters, at least one positional sensors, or a combination thereof.

3. The method of claim 1, further comprising:
    writing, by the diagnostic application, to the diagnostic report file a pass/fail status of at least one Modbus inputs, wherein the Modbus input comprise a Modbus sensor, and wherein the Modbus sensor comprises at least one density sensor.

4. The method of claim 1, further comprising:
    writing, by the diagnostic application, to the diagnostic report file a pass/fail status of a plurality of calibration data files, wherein the calibration data files correlate to a plurality of sensors.

5. The method of claim 1, further comprising:
    writing, by the diagnostic application, to the diagnostic report file a pass/fail status of the network device, wherein the network device comprises Ethernet, WIFI, Bluetooth, Bluetooth, ZigBee, Z-Wave, 6LoWPan, Thread, WiFi-ah, or combination thereof.

6. The method of claim 1, further comprising
    initializing, by the unit controller, a diagnostic application in response to a start-up procedure.

7. The method of claim 1, further comprising:
    writing, by the diagnostic application, to the diagnostic report file a unique serial number identifying the unit controller.

8. The method of claim 1, further comprising:
    establishing a communication session, by the unit controller, via a wireless communication protocol with a mobile communication network, wherein the wireless communication protocol communicates wirelessly according to at least one of a 5G, a long term evolution (LTE), a code division multiple access (CDMA), or a global system for mobile communications (GSM) telecommunications protocol;
    establishing a geographical location of the wellbore pump unit based on a location provided by the mobile communication network; and
    writing, by the diagnostic application, to the diagnostic report file the geographical location of the wellbore pump unit.

9. A method of communicating diagnostic data from a pump unit, comprising:
    starting a unit controller comprising a processor, a non-transitory memory, and an input output device;
    starting, by the unit controller, a diagnostic application executing on the unit controller in response to a start-up procedure;
    generating, by the diagnostic application, a diagnostic report file in the memory of the unit controller a pass/fail status at startup of a plurality of sensor inputs from a plurality of sensors communicatively connected to the input output device, wherein the sensors comprise a plurality of pressure sensors, flowrate sensors, valve position sensors, density sensors, or combinations thereof and wherein the sensor inputs comprise a plurality of analog inputs, frequency inputs, Modbus inputs, or combinations thereof;

writing, by the diagnostic application, to the diagnostic report file a pass/fail status at of a plurality of calibration files correlated to the plurality of sensors communicatively connected to the input output device;

writing, by the diagnostic application, i) a date stamp, ii) a time stamp, iii) a version of the diagnostic application, iv) a unique serial designation for the unit controller, or v) combinations thereof, to the diagnostic report file;

connecting, by the diagnostic application, to a database in a network location via a wireless communication protocol;

transmitting, by the diagnostic application, the diagnostic report file to a database in the network location via the wireless communication protocol;

displaying, by the diagnostic application, a passing or a failing status of the sensor inputs via an interactive display; and alerting a service center, by the diagnostic application, the passing or the failing status of the sensor inputs via the wireless communication protocol.

10. The method of claim 9, wherein:
the wireless communication protocol communicates wirelessly according to at least one of a 5G, a long term evolution (LTE), a code division multiple access (CDMA), or a global system for mobile communications (GSM) telecommunications protocol.

11. The method of claim 9, wherein:
the network location is one of i) a VNF on a network slice within a 5G core network, ii) a VNF on a network slice within a 5G edge network, a storage computer communicatively coupled to a network via a mobile communication network, or iv) a computer system communicatively coupled to the network via the mobile communication network.

12. The method of claim 9, wherein:
the network location comprises a remote application, a database, a storage device, a computer system, a virtual network function, or combination thereof.

13. The method of claim 9, further comprising:
writing, by the diagnostic application, to the diagnostic report file a pass/fail status at of a plurality of input output devices communicatively connected to the processor; and
wherein the plurality of input out devices comprises a first interactive display, a second interactive device, a keyboard, a keypad, a touch screen, or combinations thereof.

14. The method of claim 9, further comprising:
writing to memory of the unit controller, by the diagnostic application, a pass/fail status at of an input output device communicatively connected to the processor; and
wherein the input out device comprises an interactive display.

15. The method of claim 9, further comprising:
establishing a communication session by the unit controller with the wireless communication protocol with a mobile communication network.

16. A method for controlling a wellbore pumping unit, comprising:
transporting the wellbore pumping unit to a wellsite, wherein the wellbore pumping unit comprises a unit controller, a power source, and a plurality of sensors;
connecting the wellbore pumping unit to a wellbore, wherein the wellbore pumping unit is fluidically connected to the wellbore via a wellhead;
applying power from the power source to the unit controller comprising a processor and non-transitory memory;
initializing, by the unit controller, a diagnostic application executing on the unit controller in response to a start-up procedure;
generating, by the diagnostic application, a diagnostic report file in memory of the unit controller comprising a pass/fail status at startup of a plurality of sensor inputs from the plurality of sensors communicatively connected to the unit controller wherein: the sensors comprise a plurality of pressure sensors, flowrate sensors, valve position sensors, position sensors, tub level sensors, density sensors, or combinations thereof and wherein the sensor inputs comprise a plurality of analog inputs, frequency inputs, Modbus inputs, or combinations thereof;
writing, by the diagnostic application, i) a date stamp, ii) a time stamp, iii) a version of the diagnostic application, iv) a unique serial designation for the unit controller, or v) combinations thereof, to the diagnostic report file;
displaying, by the diagnostic application, a pass/fail status of the plurality of sensors via an interactive display; and
treating the wellbore, by the wellbore pumping unit, by pumping a wellbore treatment fluid into the wellbore via a wellhead.

17. The method of claim 16, further comprising:
writing, by the diagnostic application, to the diagnostic report file a pass/fail status of a plurality of input output devices communicatively connected to the processor; and
wherein the plurality of input out devices comprises a first interactive display, a second interactive device, a keyboard, a keypad, a touch screen, or combinations thereof.

18. The method of claim 16, wherein
the wellbore pumping unit is a mud pump, a cement pumping unit, a blender unit, a water supply unit, or a fracturing pump.

19. The method of claim 16, wherein
the wellbore treatment fluid comprises a drilling mud, a cement slurry, a spacer fluid, a completion fluid, or a fracturing slurry.

* * * * *